United States Patent
Hsu et al.

(10) Patent No.: US 8,598,757 B2
(45) Date of Patent: Dec. 3, 2013

(54) MAGNETIC-CONTROLLED ACTUATOR WITH AUTO-LOCKING FUNCTION FOR JOINTS OF MANIPULATION ARM

(75) Inventors: Liang-Yi Hsu, Taipei (TW); Po-Kung Wang, Taipei (TW); Mi-Ching Tsai, Taipei (TW); Ming-Yang Cheng, Taipei (TW); Chien-Chin Huang, Taipei (TW); Ching-Shiong Tsai, Taipei (TW); Hong-Cheng Sheu, Taipei (TW)

(73) Assignee: Delta Electronics, Inc., Taoyuan Shien (TW)

( * ) Notice: Subject to any disclaimer, the term of this patent is extended or adjusted under 35 U.S.C. 154(b) by 309 days.

(21) Appl. No.: 12/942,612

(22) Filed: Nov. 9, 2010

(65) Prior Publication Data
US 2012/0032545 A1    Feb. 9, 2012

(30) Foreign Application Priority Data
Aug. 4, 2010   (TW) ................................ 99125857 A

(51) Int. Cl.
*H02K 7/20*    (2006.01)
*H02K 16/00*   (2006.01)

(52) U.S. Cl.
USPC ............. 310/103; 310/114; 310/112; 310/92; 310/93; 310/95

(58) Field of Classification Search
USPC ........ 310/103, 114, 112, 92, 93, 95, 101, 268
See application file for complete search history.

(56) References Cited

U.S. PATENT DOCUMENTS

| | | | | |
|---|---|---|---|---|
| 4,501,980 A | * | 2/1985 | Welburn | 310/12.15 |
| 4,774,425 A | * | 9/1988 | Rusu et al. | 310/114 |
| 5,229,677 A | * | 7/1993 | Dade et al. | 310/268 |
| 5,528,090 A | * | 6/1996 | Satomi | 310/12.17 |
| 5,783,893 A | * | 7/1998 | Dade et al. | 310/266 |
| 2007/0159030 A1 | * | 7/2007 | Naganuma et al. | 310/49 R |
| 2008/0185929 A1 | * | 8/2008 | Hirabayashi | 310/154.14 |
| 2009/0045765 A1 | * | 2/2009 | Ichiyama | 318/538 |
| 2009/0200882 A1 | * | 8/2009 | Berdut-Teruel | 310/90 |

FOREIGN PATENT DOCUMENTS

TW    420440 U    1/2001

* cited by examiner

*Primary Examiner* — Tran Nguyen
*Assistant Examiner* — Alex W Mok
(74) *Attorney, Agent, or Firm* — Muncy, Geissler, Olds & Lowe, PLLC

(57) ABSTRACT

A magnetic-controlled actuator (100) with an auto-locking function for joints of a manipulation arm mainly includes an inner-layer stator (10), an inner-layer mover (20), an outer-layer mover (30), an outer-layer stator (40), and a fixing shaft (50). The inner-layer mover (20), the outer-layer mover (30), and the outer-layer stator (40) have a plurality of permanent magnets, respectively. The fixed shaft (50) simultaneously penetrates through the inner-layer stator (10), the inner-layer mover (20), the outer-layer mover (30), and the outer-layer stator (40) forming a coaxial arrangement. The inner-layer mover (20) rotates relatively to the inner-layer stator (10) to output power from the actuator (100). Therefore, a cogging effect, which is produced due to interaction of the permanent magnets between the outer-layer mover (30) and the outer-layer stator (40), is automatically produces a high cogging torque for the actuator (100). Thus the actuator (100) provides a sufficient locking force to lock the non-stationary inner-layer mover (20) when a power failure occurs.

5 Claims, 6 Drawing Sheets

MAGNETIC-CONTROLLED ACTUATOR WITH AUTO-LOCKING FUNCTION FOR JOINTS OF MANIPULATION ARM

BACKGROUND OF THE INVENTION

1. Field of the Invention

The present invention relates to an actuator for joints of a manipulation arm, and more particularly to a magnetic-controlled actuator with an auto-locking function for joints of a manipulation arm.

2. Description of Prior Art

In 1984, the International Organization for Standardization gave a definition of robot in ISO 8373, which defined a robot as "an automatically controlled, reprogrammable, multipurpose, manipulator programmable in three or more axes, which may be either fixed in place or mobile for use in industrial automation applications." In 1994, an industrial robot is officially defined as an automatically controlled, reprogrammable, multipurpose manipulator programmable in three or more axes. The robot should include the manipulator, actuator, and control system of software and hardware. In general, an industrial robot has a manipulator and a memory device, and the latter could be a variable-sequence control device or fixed-sequence control device. The robot is controlled to move, rotate, or expand and contract by signals sent from the memory device.

The research on the core technology of the robot is significantly developed in the developed countries, such as Europe, America, and Japan. The motor is mostly used to the drive mechanism for the traditional humanoid robot. At present, three types of manners are mainly introduced to drive the humanoid robot: a stepping motor, a speed reducing gear motor, and a high-torque brushless motor.

The stepping motor can generally be categorized into three types according to structure: permanent magnet (PM) stepping motor, variable reluctance (VR) stepping motor, and hybrid stepping motor. The rotor of the PM stepping motor is made of the permanent magnet. The rotor can produce holding torque due to the inherent magnetic, even the winding is not excited. In addition, the rotor of the VR stepping motor is made of processing the high permeability material. The rotor can not produce holding torque when the winding is not excited due to the absence of the magnetic force produced from the stator winding. Because the rotor can be particularly designed to increase efficiency, the VR stepping motor could provide larger torque. In general, the stepping angle of the VR stepping motor is 15 degrees, and the VR stepping motor is usually provided for machine tools which can provide larger torque and accurate positioning. In addition, the rotor of the hybrid stepping motor is made of installing a number of gear-shaped protruding electrodes and installing axial-direction permanent magnets. Hence, the hybrid stepping motor can be regarded as the combination of the PM stepping motor and the VR stepping motor. Accordingly, the hybrid stepping motor has the advantages of both the PM stepping motor and the VR stepping motor, namely, including the advantages of high accuracy and high torque. In general, the stepping angle of the hybrid stepping motor is smaller than the above-mentioned stepping motors and is between 1.8 degrees and 3.6 degrees. The stepping motor has the following features and advantages:

(1) The simple system structure; (2) The rotating speed is proportional to the frequency of the digital pulse; (3) The stepping motor is easily controlled; (4) The position sensor is not needed; (5) The lower costs; (6) The stepping motor is easily integrated with computers or digital machines; (7) The carbon brushes and the slip rings are not needed; (8) The high reliability; and (9) The use life is limited by the bearing.

The stepping motor, however, has the following disadvantages:

(1) The efficiency is lower; (2) The out-of-step condition easily occurs when the stepping motor operates at a high-speed or high-torque condition; (3) The resonance phenomenon is easily produced at a specific frequency; and (4) The less reliability is performed in the heavy-load condition.

The speed reducing gear motor is most commonly used in the robot application. In general, the speed reducer must have the very low backlash when operating in very high axial- and radial-directional loads, thus converting a high input speed into a low output speed and sending a large output torque. The speed reducer is easily installed and accurately aligned on the motor so that the generated noise and vibration are least. The speed reducing gear motor has the following features and advantages:

(1) The scheme is used in low-speed high-torque applications; (2) The motor can be easily designed and controlled for using in high-efficiency operation; (3) The simple feedback control can be implemented; (4) The speed reducing gear motor is easily integrated with computers or digital machines; (5) The high reliability; and (6) The use life is limited by the bearing.

The speed reducing gear motor, however, has the following disadvantages:

(1) The miniaturization is not easily completed; (2) The position ability is limited by the speed reducing mechanism; (3) The mechanism is often maintained; (4) The system structure is complicated; (5) The costs of the speed reducer is higher; and (6) The key technology has been mastered by foreign companies.

NdFeB magnet is used widely in brushless DC motor. Compared with other kinds of motors, the brushless motors has certain advantages, such as small volume, high power, and high torque, and also lower EMI and easy maintenance due to the absence of the carbon brush. In the high-torque robot application, however, the above-mentioned scheme has certain disadvantages. For example, a large-volume motor is required, an overheating issue occurs due to the over current, and the motor has a low efficiency.

Accordingly, it is desirable to provide a magnetic-controlled actuator with an auto-locking function for joints for a manipulation arm that produces a high cogging torque due to interaction of the permanent magnets, thus providing a sufficient locking force to lock the non-stationary inner-layer mover when a power failure occurs.

SUMMARY OF THE INVENTION

In order to achieve the above-mention objectives, a magnetic-controlled actuator with an auto-locking function for joints of a manipulation arm is disclosed. The actuator includes an inner-layer stator, an inner-layer mover, an outer-layer mover, an outer-layer stator, and a fixed shaft. The inner-layer stator includes a core and a winding winded on the core. The inner-layer mover surrounds on an outer diameter of the inner-layer stator, and the inner-layer mover is formed by alternatively installing a plurality of N-pole, S-pole permanent magnets, and a plurality of iron materials. The outer-layer mover is surrounded on an outer diameter of the inner-layer mover, and the outer-layer mover is formed by alternatively installing a plurality of N-pole, S-pole permanent magnets, and a plurality of iron materials. The outer-layer stator surrounds on an outer diameter of the inner-layer mover and stacks on the outer-layer mover, and the outer-layer stator formed by alternatively installing a plurality of N-pole, S-pole permanent magnets, and a plurality of iron materials. The fixed shaft penetrates through the inner-layer stator.

The actuator further includes a top cover of the outer-layer mover, a top cover of the inner-layer mover, a bottom cover of the inner-layer mover, and a bottom cover of the outer-layer stator. The top cover of the outer-layer mover covers the outer-layer mover, and the top cover of the outer-layer mover has a U-shaped slot on a top surface thereof. The top cover of the inner-layer mover covers one side of the inner-layer mover, and the top cover of the inner-layer mover has a convex pillar on a top surface thereof. The bottom cover of the inner-layer mover covers the other side of the inner-layer mover. The bottom cover of the outer-layer stator covers the outer-layer stator. In particular, the convex pillar of the top cover of the inner-layer mover penetrates through the U-shaped slot of the top cover of the outer-layer mover, and the convex pillar is driven by the inner-layer mover to rotate in the U-shaped slot, thus determining the rotating path of the actuator. In addition, the top cover of the inner-layer mover has a first center hole, and the bottom cover of the inner-layer mover ahs a second center hole.

The actuator further includes a first bearing and a second bearing. The first bearing is embedded in the first center hole and the fixed shaft penetrates through the first bearing. The second bearing is embedded in the second center hole and the fixed shaft penetrates through the second bearing.

Therefore, a cogging effect, which is produced due to interaction of the permanent magnets between the outer-layer mover and the outer-layer stator, is automatically produces a high cogging torque for the actuator. Thus the actuator provides a sufficient locking force to lock the non-stationary inner-layer mover when a power failure occurs.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
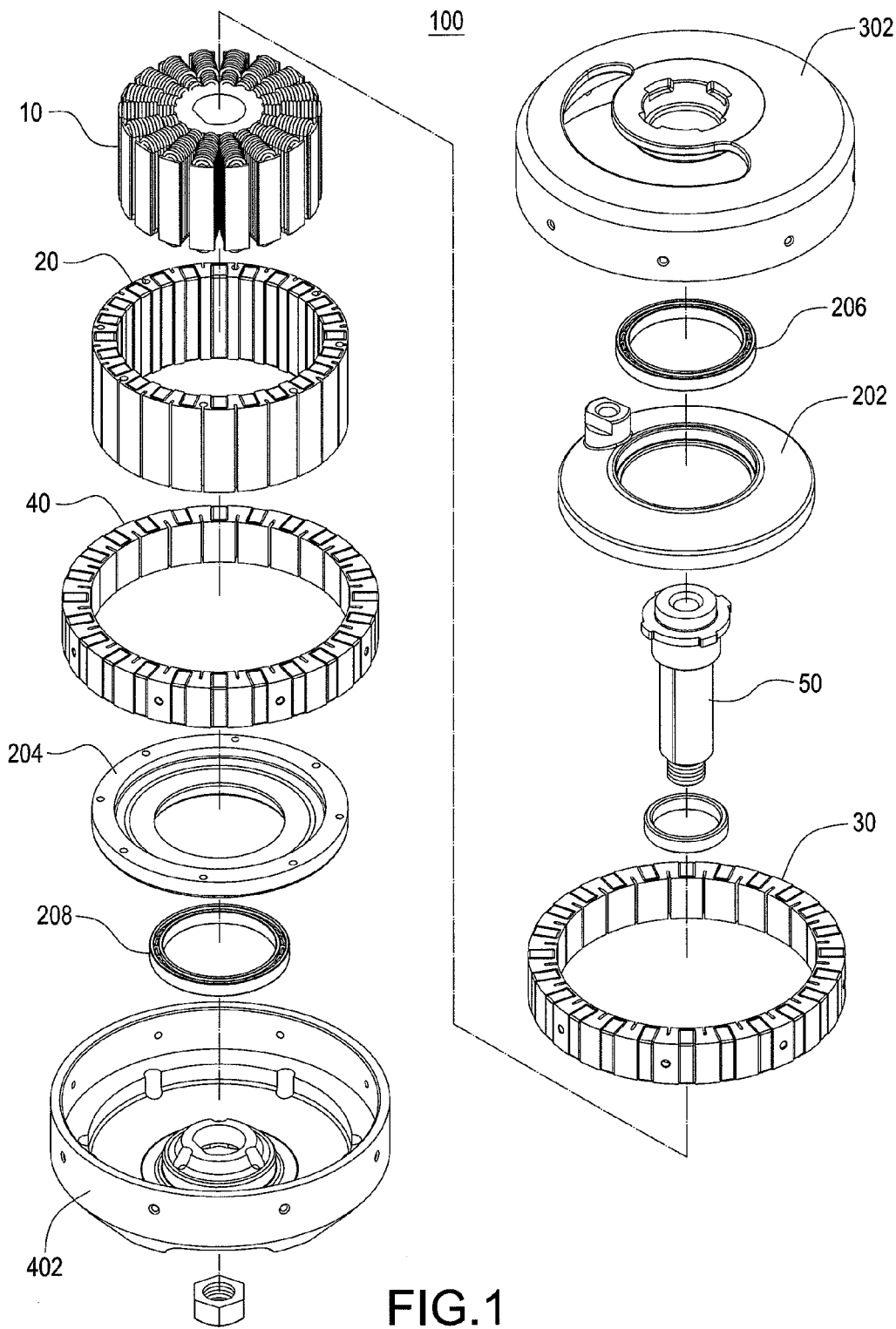
FIG. 1 is an exploded view of a magnetic-controlled actuator with an auto-locking function for joints of a manipulation arm according to the present invention.

Reference will now be made to the drawing figures to describe the present invention in detail.

Figure 2:
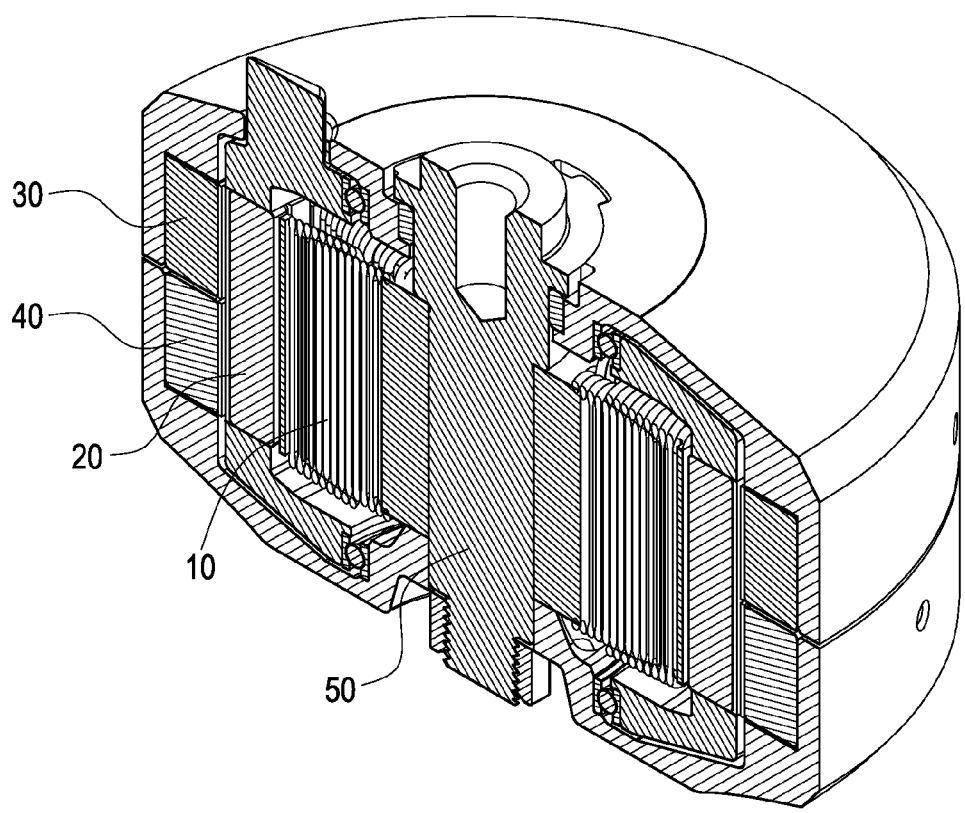
FIG. 2 is a cross-sectional view of the magnetic-controlled actuator with an auto-locking function for joints of the manipulation arm.

Reference is made to FIG. 1 and FIG. 2 which are an exploded view and a cross-sectional view of a magnetic-controlled actuator with an auto-locking function for joints of a manipulation arm according to the present invention, respectively. The magnetic-controlled actuator mainly includes an inner-layer stator 10, an inner-layer mover 20, an outer-layer mover 30, an outer-layer stator 40, and a fixed shaft 50.

The inner-layer stator 10 includes a core 102 and a winding 104 which is winded on the core 102. The inner-layer stator 10 is a multi-pole stator. The inner-layer mover 20 surrounds an outer diameter of the inner-layer stator 10, and the inner-layer mover 20 is formed by alternatively installing a plurality of N-pole permanent magnets (not labeled), a plurality of S-pole permanent magnets (not labeled), and a plurality of iron materials (not labeled). The inner-layer mover 20 is formed by alternatively installing the N-pole permanent magnet, the iron material, the S-pole permanent magnet, and the iron material sequentially. That is, the N-pole permanent magnets, the S-pole permanent magnets, and the iron material are circularly installed to form the inner-layer mover 20.

The outer-layer mover 30 surrounds an outer diameter of the inner-layer mover 20, and the outer-layer mover 30 is formed by alternatively installing a plurality of N-pole permanent magnets (not labeled), a plurality of S-pole permanent magnets (not labeled), and a plurality of iron materials (not labeled). The outer-layer mover 30 is formed by alternatively installing the N-pole permanent magnet, the iron material, the S-pole permanent magnet, and the iron material sequentially. That is, the N-pole permanent magnets, the S-pole permanent magnets, and the iron material are circularly installed to form the outer-layer mover 30. The outer-layer stator 40 surrounds outer diameter of the inner-layer mover 20 and stacks on the outer-layer mover 30, and the outer-layer stator 40 is formed by alternatively installing a plurality of N-pole permanent magnets (not labeled), a plurality of S-pole permanent magnets (not labeled), and a plurality of iron materials (not labeled). The outer-layer stator 40 is circularly formed by alternatively installing the N-pole permanent magnet, the iron material, the S-pole permanent magnet, and the iron material sequentially. That is, the N-pole permanent magnets, the S-pole permanent magnets, and the iron material are circularly installed to form the outer-layer stator 40. The fixed shaft 50 penetrates through the inner-layer stator 10. Thus, the inner-layer stator 10, the inner-layer mover 20, the outer-layer mover 30, and the outer-layer stator 40 are simultaneously penetrated by the fixed shaft 50 to form a coaxial arrangement.

Figure 4:
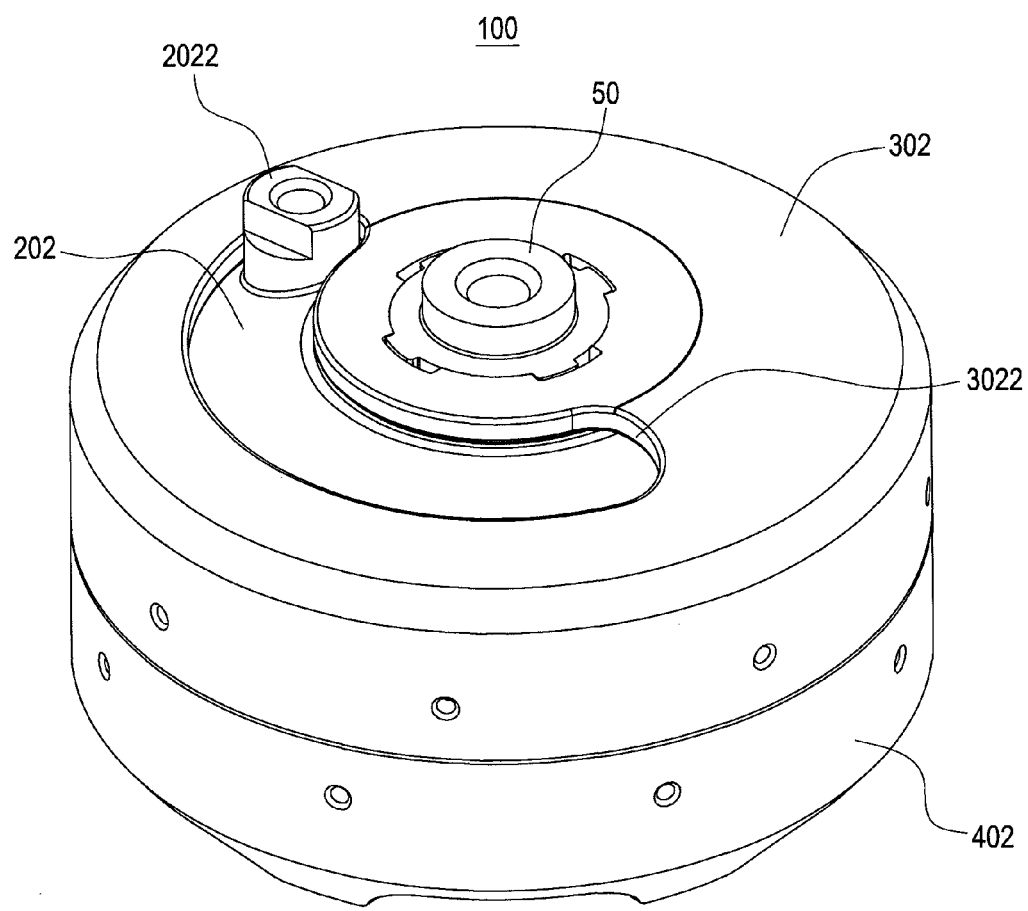
FIG. 4 is an assembled view of the magnetic-controlled actuator with an auto-locking function for joints of the manipulation arm.

Reference is made to FIG. 4 which is an assembled view of the magnetic-controlled actuator with an auto-locking function for joints of the manipulation arm. The magnetic-controlled actuator 100 further includes a top cover of the outer-layer mover 302, a top cover of the inner-layer mover 202, a bottom cover of the inner-layer mover 204, and a bottom cover of the outer-layer stator 402. The top cover of the outer-layer mover 302 covers the outer-layer mover 30, and the top cover of the outer-layer mover 302 has a U-shaped slot 3022 on a top surface thereof. The top cover of the inner-layer mover 202 covers one side of the inner-layer mover 20 (in this embodiment, the top cover of the inner-layer mover 202 covers on the top half portion of the inner-layer mover 20 along the axial direction of the fixed shaft 50), and the top cover of the inner-layer mover 202 has a convex pillar on a top surface thereof. The bottom cover of the inner-layer mover 204 covers the other side of the inner-layer mover 20 (in this embodiment, the bottom cover of the inner-layer mover 204 covers on the bottom half portion of the inner-layer mover 20 along the axial direction of the fixed shaft 50). The bottom cover of the outer-layer stator 402 covers the outer-layer stator 40. In particular, the convex pillar 2022 of the top cover of the inner-layer mover 202 penetrates through the U-shaped slot 3022 of the top cover of the outer-layer mover 302, and the convex pillar 2022 is driven by the inner-layer mover 202 to rotate in the U-shaped slot 3022, thus determining the rotating path of the actuator 100 and providing the actual output power from the actuator 100. In addition, the rotating path of the actuator 100 can be flexibly adjusted according to the demands of the power accessories. In particular, the fixed shaft 50 and the outer-layer mover 30 provide a slot configured to limit the switch angle between the outer-layer stator 40 and the outer-layer mover 30.

In addition, the top cover of the inner-layer mover 202 has a first center hole (not labeled), and the bottom cover of the inner-layer mover 204 has a second center hole (not labeled).

The magnetic-controlled actuator 100 further includes a first bearing 206 and a second bearing 208. The first bearing 206 is embedded in the first center hole of the top cover of the inner-layer mover 202, and the fixed shaft 50 penetrates through the first bearing 206. Furthermore, the second bearing 208 is embedded in the second center hole of the bottom cover of the inner-layer mover 204, and the fixed shaft 50 penetrates through the second bearing 208.

The detailed description of operation of the magnetic-controlled actuator 100 will be made hereinafter. The stationary magnetic field (which is generated by the N-pole permanent magnets and the S-pole permanent magnets of the inner-layer stator 10) is cut by a rotating magnetic field (which is generated by the N-pole permanent magnets and the S-pole permanent magnets of the inner-layer mover 20) when the winding 104 of the inner-layer stator 10 is excited. Accordingly, the convex pillar 2022 of the inner-layer mover 20 can be driven to move (rotate) in the U-shaped slot 3022, thus the actuator 100 outputs power due to the relative rotation movement between the inner-layer mover 20 and the inner-layer stator 10.

Figure 3A:
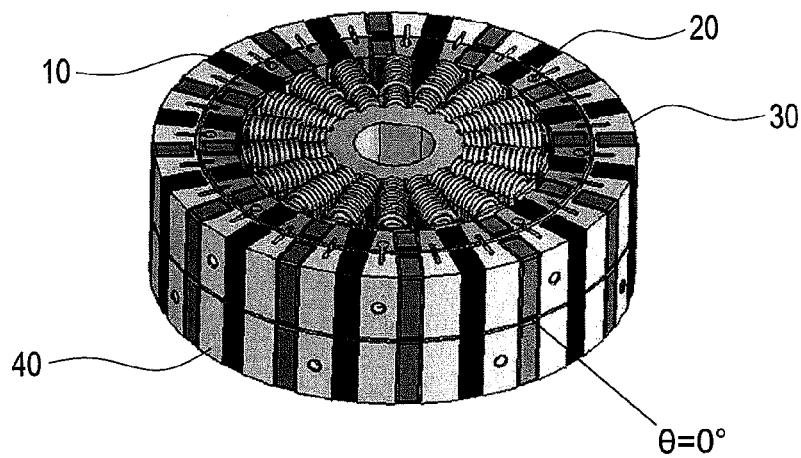
FIG. 3A is an assembled view of an outer-layer mover rotating zero degree (without rotating) relatively to an outer-layer stator of the magnetic-controlled actuator with an auto-locking function for joints of the manipulation arm.
Figure 3B:
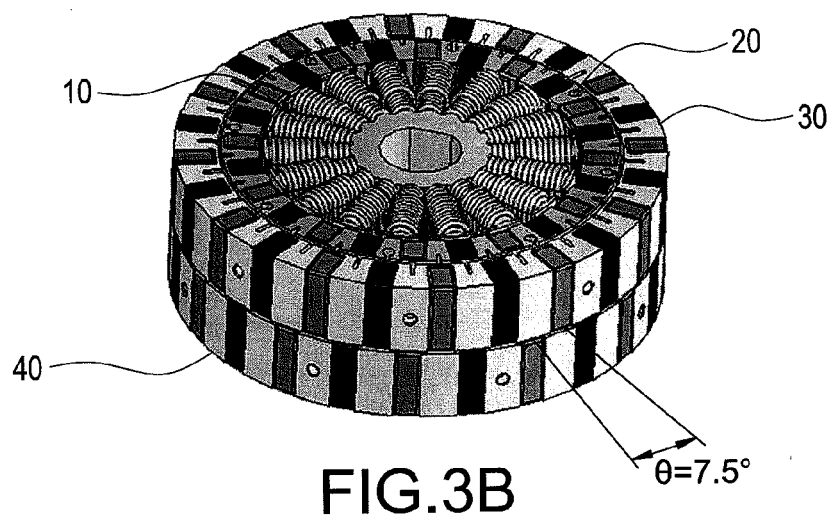
FIG. 3B is an assembled view of the outer-layer mover rotating 7.5 degrees relatively to the outer-layer stator of the magnetic-controlled actuator with an auto-locking function for joints of the manipulation arm.
Figure 3C:
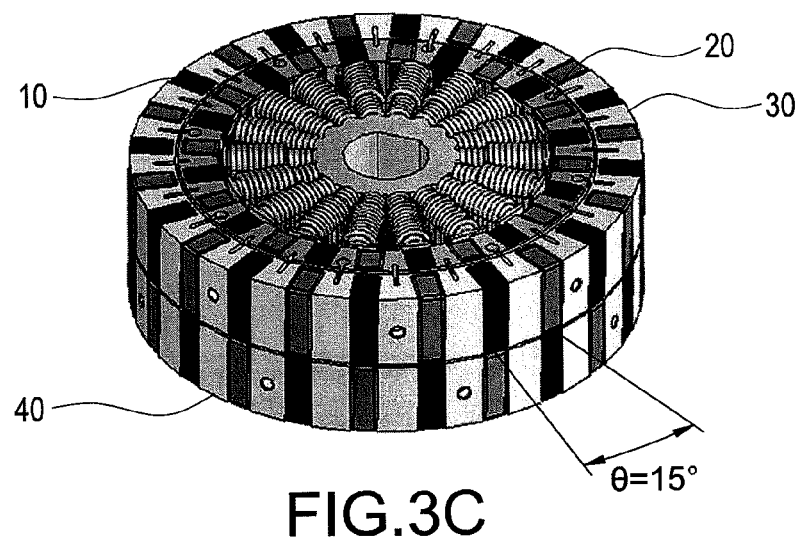
FIG. 3C is an assembled view of the outer-layer mover rotating 15 degrees relatively to the outer-layer stator of the magnetic-controlled actuator with an auto-locking function for joints of the manipulation arm.

Reference is made to FIG. 3A, FIG. 3B, and FIG. 3C which are an assembled view of an outer-layer mover rotating zero degree (without rotating), 7.5 degrees, and 15 degrees relatively to an outer-layer stator of the magnetic-controlled actuator, respectively. The auto-locking principle of the magnetic-controlled actuator is that a stationary magnetic field (which is generated by the N-pole permanent magnets and the S-pole permanent magnets of the outer-layer stator 40) is cut by a rotating magnetic field (which is generated by the N-pole permanent magnets and the S-pole permanent magnets of the outer-layer mover 30). Thus, the outer-layer mover 30 rotates a rotating angle θ which is correspondingly to the motionless outer-layer stator 40. In the example, FIG. 3C illustrates that the outer-layer mover 30 rotates 15 degrees (the rotating angle θ=15°) in a counter-clockwise direction, FIG. 3B illustrates that the outer-layer mover 30 rotates 7.5 degrees (the rotating angle θ=7.5°) in a counter-clockwise direction, and FIG. 3A illustrates that the outer-layer mover 30 is motionless (the rotating angle θ=0°).

In addition, the top cover of the outer-layer mover 302 covers the outer-layer mover 30 and then the two are fastened together through a number of position pins. Also, the bottom cover of the outer-layer stator 402 covers the outer-layer stator 40 and then the two are fastened together through a number of position pins. In addition, the position pins can be used to indicate the relative position between the top cover of the outer-layer mover 302 and the bottom cover of the outer-layer stator 402. That is, the position pins for the top cover of the outer-layer mover 302 are aligned with those for the bottom cover of the outer-layer stator 402 when the outer-layer mover 30 is motionless. However, the position pins for the top cover of the outer-layer mover 302 and those for the bottom cover of the outer-layer stator 402 are interlaced when the outer-layer mover 30 rotates.

When the corresponding magnet poles of the outer-layer stator 40 and those of the outer-layer mover 30 are aligned, the magnetic path between the magnet poles is closed, thus producing a larger cogging force. Accordingly, the magnetic-controlled actuator 100 is operated at a high cogging torque condition and produces a larger locking force to lock the inner-layer mover 20, thus driving a heavy load when a power failure occurs. In addition, the magnetic path (which is formed between the outer-layer stator 40 and the outer-layer mover 30) is half-opened when the corresponding magnet poles of the outer-layer stator 40 and those of the outer-layer mover 30 are opposite (180-degree difference of an electrical angle, namely, 15-degree difference of a mechanical angle for the 24-pole outer-layer stator 40 and the outer-layer mover 30), thus producing a smaller cogging force. Accordingly, the magnetic-controlled actuator 100 is operated at a low cogging torque condition and controllable condition. In this operation condition, the convex pillar 2022 of the inner-layer mover 20 can be driven to move (rotate) in the U-shaped slot 3022 when the winding 104 of the inner-layer stator 10 is excited. Accordingly, the magnetic-controlled actuator 100 can provide a rotation movement to output power.

Figure 3D:
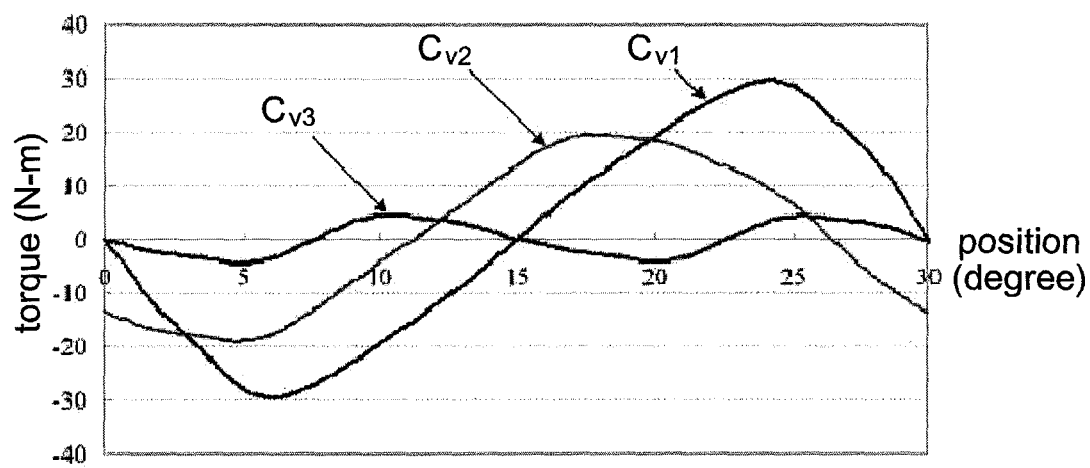
FIG. 3D is a waveform diagram of the holding torque generated from rotating the outer-layer mover of the magnetic-controlled actuator with an auto-locking function for joints of the manipulation arm.

FIG. 3D is a waveform diagram of the holding torque generated from rotating the outer-layer mover of the magnetic-controlled actuator with an auto-locking function for joints of the manipulation arm. The abscissa represents the rotating angle of the inner-layer mover 20, and the ordinate represents the magnitude of the holding torque generated by the outer-layer mover 30. There are three curves are illustrated in FIG. 3D, which indicates the variation of the holding torque when the outer-layer mover 30 rotates zero degree (first curve Cv1), 7.5 degrees (second curve Cv2), and 15 degrees (third curve Cv3), respectively. Obviously, the magnetic-controlled actuator 100 is operated in a high cogging torque condition and the maximum torque about 30 N-m is generated (referring to the first curve Cv1) when the corresponding magnet poles of the outer-layer stator 40 and the outer-layer mover 30 are aligned, that is, the outer-layer mover 30 does not rotate. In addition, the magnetic-controlled actuator 100 is operated in a low cogging torque condition and the maximum torque about 5 N-m is merely generated (referring to the second curve Cv3) when the corresponding magnet poles of the outer-layer stator 40 and the outer-layer mover 30 is opposite (180-degree difference of the electrical angle), that is, the outer-layer mover 30 rotates 15 degrees relatively to the outer-layer stator 40. In addition, the magnetic-controlled actuator 100 is operated in a middle cogging torque condition (between the low and high cogging torque condition) and the maximum torque about 20 N-m is generated (referring to the second curve Cv2) when the corresponding magnet poles of the outer-layer stator 40 and the outer-layer mover 30 is between the 0 degree and 180 degrees, that is, the outer-layer mover 30 rotates 7.5 degrees relatively to the outer-layer stator 40.

Figure 5A:
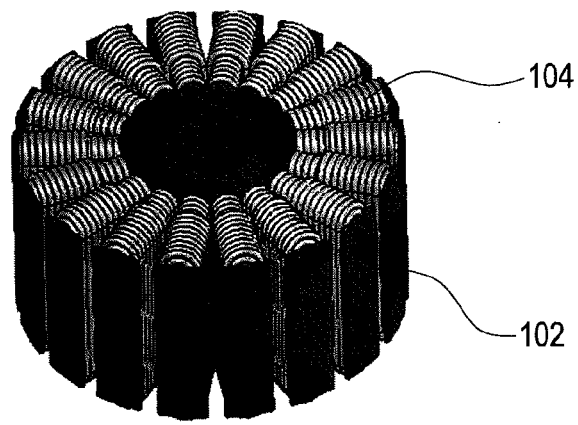
FIG. 5A is a perspective view of a first embodiment of winding a winding on a core of an inner-layer stator.
Figure 5B:
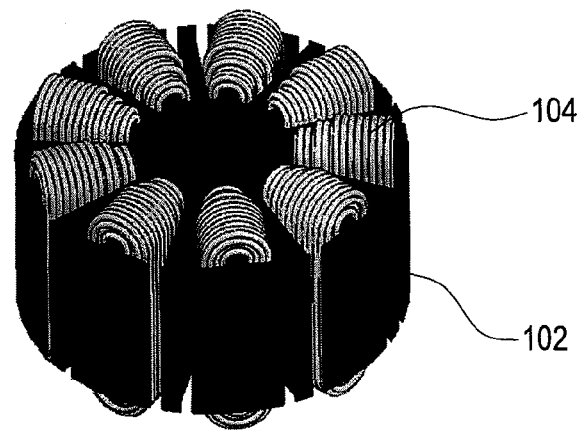
FIG. 5B is a perspective view of a second embodiment of winding the winding on the core of the inner-layer stator.
Figure 5C:
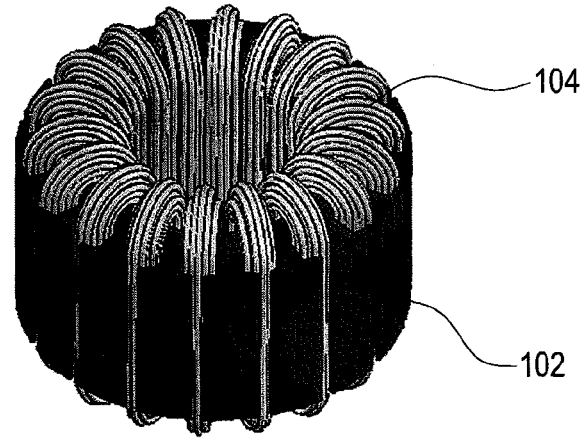
FIG. 5C is a perspective view of a third embodiment of winding the winding on the core of the inner-layer stator.

Reference is made to FIG. 5A, FIG. 5B, and FIG. 5C which are a perspective view of three different embodiments of winding a winding on a core of an inner-layer stator. In particular, the various winding styles can be implemented by designing the inner-layer stator 10 in different forms. The inherent disadvantages of the magnetic path and structure of the motor can be overcome by providing different variations of the magnetic path, thus easily implementing the actuator and providing the required high holding torque.

Briefly speaking, the magnetic-controlled actuator 100 can be integrated with a mechanism to provide a sufficient locking force to lock the non-stationary inner-layer mover 20 when a power failure occurs. That is, a cogging force is generated through the inner magnets of the magnetic-controlled actuator 100 to lock the joints of the manipulation arm in a holding status so that the small, light, and high-torque magnetic-controlled actuator 100 can be implemented.

In conclusion, the present invention has following advantages:

1. The magnetic-controlled actuator has the capability of providing high torque at low speed, and the produced high and low cogging torque can be arbitrarily switched. In particular, the high cogging torque is generated to provide a sufficient locking force to lock the non-stationary inner-layer mover when a power failure occurs, thus achieving the energy-saving demand.

2. Design of the thin magnetic-controlled actuator without any deceleration mechanism can be implemented to reduce the volume, equipment costs, and maintain costs of the actuator.

3. The magnetic-controlled actuator can automatically operated at the high cogging torque condition when a power failure occurs, thus increasing the security and reliability of the system; and 4. The magnetic-controlled actuator can be easily controlled by using a feedback scheme.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A magnetic-controlled actuator with an auto-locking function for joints of a manipulation arm comprising:
    an inner-layer stator comprising a core and a winding winded on the core;
    an inner-layer mover surrounding an outer diameter of the inner-layer stator, and the inner-layer mover formed by circularly installing a plurality of N-pole permanent magnets, a plurality of S-pole permanent magnets, and a plurality of iron materials to form the N-pole permanent magnet, the iron material, the S-pole permanent magnet, and the iron material sequentially;
    an outer-layer mover surrounding an outer diameter of the inner-layer mover, and the outer-layer mover formed by circularly installing a plurality of N-pole permanent magnets, a plurality of S-pole permanent magnets, and a plurality of iron materials to form the N-pole permanent magnet, the iron material, the S-pole permanent magnet, and the iron material sequentially;
    an outer-layer stator surrounding an outer diameter of the inner-layer mover and stacking on the outer-layer mover in axial direction, and the outer-layer stator formed by circularly installing a plurality of N-pole permanent magnets, a plurality of S-pole permanent magnets, and a plurality of iron materials to form the N-pole permanent magnet, the iron material, the S-pole permanent magnet, and the iron material sequentially; and
    a fixed shaft penetrating through the inner-layer stator;
    wherein a cogging effect, which is produced due to interaction of the permanent magnets between the outer-layer mover and the outer-layer stator; when a polarity relationship between the permanent magnets of the outer-layer mover and the permanent magnets of the outer-layer stator is identical, a magnetic path between the magnet magnets is closed to automatically produce a high cogging torque for the actuator, thus the actuator provides a sufficient locking force to lock the non-stationary inner-layer mover when a power failure occurs; when the polarity relationship is opposite, the magnetic path is half-closed to automatically produce a small cogging torque for the actuator, thus the actuator is controllable.

2. The magnetic-controlled actuator in claim 1, further comprising:
    a top cover of the outer-layer mover covering the outer-layer mover, and the top cover of the outer-layer mover having a U-shaped slot on a top surface thereof;
    a top cover of the inner-layer mover covering one side of the inner-layer mover, and the top cover of the inner-layer mover having a convex pillar on a top surface thereof;
    a bottom cover of the inner-layer mover covering the other side of the inner-layer mover; and
    a bottom cover of the outer-layer stator covering the outer-layer stator;
    wherein the convex pillar of the top cover of the inner-layer mover penetrates through the U-shaped slot of the top cover of the outer-layer mover, and the convex pillar is driven by the inner-layer mover to rotate in the U-shaped slot, thus determining the rotating path of the actuator.

3. The magnetic-controlled actuator in claim 2, wherein the top cover of the inner-layer mover has a first center hole; the magnetic-controlled actuator further comprises a first bearing, and the first bearing embedded in the first center hole and the fixed shaft penetrating through the first bearing.

4. The magnetic-controlled actuator in claim 2, wherein the bottom cover of the inner-layer mover has a second center hole; the magnetic-controlled actuator further comprises a second bearing, and the second bearing embedded in the second center hole and the fixed shaft penetrating through the second bearing.

5. The magnetic-controlled actuator in claim 1, wherein the inner-layer stator is a multi-pole stator.

* * * * *